Patented Mar. 31, 1936

2,035,606

UNITED STATES PATENT OFFICE 2,035,606

COATED CATALYSTS

Alphons O. Jaeger, Mount Lebanon, Pa., assignor, by mesne assignments, to American Cyanamid & Chemical Corporation, a corporation of Delaware No Drawing. Application April 30, 1931, Serial No. 534,142

4 Claims. (Cl. 23—233)

This invention relates to the preparation and use of catalysts, and more particularly to catalysts for vapor phase reactions.

Objects of the invention are to produce a class of catalysts having a high degree of resistivity to the high temperatures encountered in vapor phase catalysis, and one in which the catalyst has a long effective life with little or no secondary change. A further object is to produce a class of catalysts which are relatively cheap and easy to prepare, and which can readily be regenerated when their activity has become diminished.

The catalysts of the present invention are prepared by spraying or otherwise coating catalytically active material upon the surfaces of fragments of quartz or other silicious material, such as metal silicates and the like, which surfaces have previously been activated by leaching with acids or alkalies or both. Catalysts prepared in this manner are activated by silica present in the quartz or silicate material, and are extremely resistant to high temperatures by reason of its great infusibility. The etching produces a rough or corrugated surface to which the catalytic material is readily applied and to which it adheres firmly, thus producing a contact mass having a long effective life and highly resistant to mechanical abrasion.

The leaching of the quartz or other silicious material may be effected by treatment with acids or with alkalies, or by successive treatments with both acids and alkalies. Hydrofluoric acid, for example, is a very effective agent for producing a preliminary etching or roughening of the surfaces, while such alkalies as caustic soda, caustic potash and the like may be used for the double purpose of etching the surface and also producing a surface film of silica or alkali or alkaline earth metal silicate which is very useful in certain branches of catalysis. The use of metallates as leaching agents, either with or without a previous or succeeding acid or alkali wash is also effective for this purpose, and presents the added advantage that the etching action may be more finely adjusted and that a certain amount of the metallate is left upon the surface of the etched fragments. Mixtures such as potassium acid sulfate and potassium fluoride may also be used as well as such substances as sodium metaphosphate, which may also leave desirable stabilizing components on the surfaces of the fragments.

While many valuable catalysts may be prepared by coating the surfaces of silicious fragments which have been directly etched with acids, alkalies or metallates it is often desirable, particularly for unstabilized catalysts, to follow the etching treatment by a wash with dilute acid, such as hydrochloric acid, sulfuric acid, and the like, in order to remove the last traces of alkali or other etching agent. This acid wash may then be followed by a water wash, or a second wash with dilute alkali, or both, in order that the silicious fragments may be completely neutral. An acid wash is also frequently of advantage when the fragments are to be subjected to a further metallate treatment, since the strength of alkali necessary to produce an effective etching is often in excess of that desired when metallates are used. The strength and extent of the acid wash is however a factor that may vary in the production of different catalysts, or even in the production of similar catalysts for use under differing conditions, and will be determined in each case by the skilled catalytic chemist.

The range of silicious materials which may be etched according to the present invention and used in the production of catalysts is a broad one, and most any form of silica or silicate may be so used. In addition to quartz, which is the preferred carrier, flint or other silica rocks, or such natural or artificial silicates as glass, granite, or basalt may be used, and may be etched by alkali alone, by alkalies in conjunction with metallates, or by acids, either singly or in combination. It will be noted that the silicate materials containing catalytically active metals such as basalt, chrysoprase, etc., may, upon leaching, have activating qualities by reason of these metals as well as because of the silica present.

The etched silicious material, prepared as above described, may be coated with any desired catalytic material to produce catalysts of the present invention, but I have discovered that the advantages of the invention are most fully realized when metal, metal salt, and metal oxide catalysts are so used. For reductions and hydrogenations, the nitrates or other salts of such metals as zinc, copper, iron, cobalt, silver and the like may be applied as a coating and after suitable treatment with hydrogen or other reducing gases form excellent catalysts. For oxidation reactions the oxides, salts or metallates of the metal elements of the 5th, 6th and 7th groups of the periodic system may be used, either singly or in combination, with or without the addition of other components which are not specific catalysts for the desired reaction. When these substances are used in the form of salts, the anions may advantageously be those which have a stabilizing or stabilizer promoter action, such metals as iron, aluminum, zinc, nickel, silver, copper, and the alkali forming metals being particularly effective. Composite catalysts may also be prepared by applying catalytically effective materials having varying characteristics, the coatings being effected either simultaneously or successively.

Many complex compounds may also be advantageously coated upon the surfaces of etched quartz and form excellent catalysts. Base exchange bodies, both silicious and non-silicious, may be so used, as well as their leached derivatives and the salt-like bodies resulting from their combination with certain anions to form insoluble compounds. Base exchange catalysts of this kind which contain the catalytically active metals above specified are particularly useful, and may be used with or without stabilizers. Catalysts of this type are not claimed per se in the present application, as these form the subject matter of my prior patents, Nos. 1,694,620, dated December 11, 1928; 1,728,732, dated September 17, 1929 and the patents of Jaeger and Bertsch Nos. 1,701,075 dated February 5, 1929 and 1,782,353, dated November 18, 1930, but are claimed only in combination with the etched silica or silicate carrier. Other complex compounds which have no base exchange properties may also be used in this manner, such as the non-base exchanging polysilicates, polyvanadates, etc.

Coating of the etched silicious fragments may be effected in any desired manner, such method as spraying of solutions or suspensions of the catalytic material onto the fragments in a heated state being particularly effective. Other methods such as soaking of the fragments in dilute or concentrated solutions or suspensions of the catalytic material may also be used, and the invention is not limited to any specific method of applying the catalyst coating.

While etching of the silicious fragments with acids, or with alkalies followed by an acid wash, is suitable for the production of many coated catalysts in which metals, or oxides or salts of metals, are used as catalytically active material, I have found that etching with alkali, or with alkali metals, or both, can be made to produce a particularly important function in the preparation of the stabilized catalysts, that is to say, those in which the activity of the catalyst for total combustion or other undesired activity is damped by the presence of compounds of alkali or alkaline earth metals. The treatment with alkalies, and in many cases with alkali metallates, leaves a thin film of alkali metal silicate or metallate on the surface of the silicious fragments, which is highly active and tends to combine its activity with that of the catalytic material applied to produce a stabilizing and activating effect. For example, it is known that silica is an excellent activator for metal oxide and metallate catalysts, and particularly for vanadium compounds, and the active silica of the silicate film, being in intimate association with the applied catalytic material, forms an excellent activator of this type. Similarly, where metallates such as aluminates have been used as the etching agent, the alumina or other amphoteric metal oxide acts as an activator for the catalyst in the same manner. Where alkalies such as sodium hydroxide, potassium hydroxide, calcium hydroxide, and the like are used for etching, these metals are also present in the surface film and their compounds serve as stabilizers for the applied catalyst.

Where a surface film of the above described type is desired, but without free alkalinity, a special method of preparing the etched silicious fragments consists in etching with alkalies or alkalies and metallates, followed by treatment with acid gases such as $SO_2$, $SO_3$, HCl and the like, which neutralize undesired alkalinity of the surface film but do not remove it. Such treatment with acid gases may be followed by a water wash if desired, particularly where, as in the case of calcium hydroxide and $SO_3$ gases, at least one of the reaction products is difficultly soluble in water. A treatment with acid gases may also follow the application of the catalytic material itself, in which case the neutralization is also effected along with secondary changes in the applied catalytic material.

The invention will be illustrated in greater detail in the accompanying examples, which are for illustrative purposes only and to which it is not limited.

*Example 1*

Quartz fragments the size of a pea or larger are boiled for 1–2 hours with a concentrated NaOH solution, after which they are thoroughly washed with water. The fragments are then sprayed with ammonium vanadate in the ratio of 300 c. c. of the fragments to 20 grams ammonium vanadate, which is dissolved in water and applied to the heated fragments in such a manner that the water dissolves as fast as the spray is applied. The contact mass so obtained is heated for 1½–2 hours at 250–300° C. and is then an excellent catalyst for the air oxidation of acenaphthene to naphthalic anhydride.

*Example 2*

Quartz fragments are etched with NaOH or KOH as in Example 1, and after washing with water are coated with ammonium vanadate or with silver vanadyl vanadate, which may be prepared in the following manner.

300 parts of $V_2O_5$ are intimately mixed with about 93 parts of silver nitrate and melted together. The melt is heated until reaction is completed, and the quartz fragments are dipped into the molten liquid until a thorough coating is obtained. The fragments thus coated are immediately transferred to an oven where they are gradually cooled, the molten material going into the puffed, porous silver vanadyl vanadate during cooling with evolution of oxygen. The fragments so coated are filled into a converter and naphthalene, vaporized with air in the proportion of 1–15 to 1–20 parts by weight are passed over them at 390–440° C. Good yields of phthalic anhydride of high purity are obtained.

If higher yields are desired, the etched fragments are treated with $SO_2$ or $SO_3$ gases without the preliminary water wash, in which case the sodium sulfite or sodium sulfate produced is a stabilizer for the catalyst and prevents excessive combustion of the naphthalene to carbon dioxide and water.

*Example 3*

Flint fragments of 6–8 mesh are given a preliminary etching with hydrofluoric acid or with a mixture of potassium acid sulfate and potassium fluoride, and are then well washed with water. The roughened fragments so obtained are boiled with concentrated potassium hydroxide solution, drained and again thoroughly washed with distilled water.

The carrier material so prepared is heated and coated with a suspension of aluminum vanadate, in the proportion of 17 grs. of the vanadate to each 250 c. c. and produces an excellent catalyst for the oxidation of benzol, phenol, furfural, and other compounds containing the group

—$CH_2$—CH=CH—$CH_2$— to maleic and fumaric acids. Vapors of the compounds, admixed with air, are passed over the catalyst at 320–450° C. and excellent yields of these products are obtained. At temperatures of 380–420° C. good yields of an anthraquinone of excellent purity are obtained when anthracene vapors admixed with air in the proportion of 1:30–40 parts by weight are passed over the same catalyst, which in this case may advantageously be given a preliminary calcination with hot $SO_2$ gases.

*Example 4*

Quartz fragments are boiled with sodium or potassium aluminate, zincate or other metallate solutions containing excess alkali and are then washed with water, the adhering film of metallate and alkali metal silicate forming an excellent base for coated catalysts.

The carrier may be coated with ammonium or aluminum vanadate as in previous examples or with ferric pyro-vanadate, which may be applied in the following manner:

18.2 parts of $V_2O_5$ are dissolved in 250 parts of potassium hydroxide solution containing 22.6 parts of 100% KOH. 27 parts of ferric sulfate are dissolved in 300 parts of water at 50–60° C. and the potassium vanadate solution is poured in with vigorous agitation. The yellow precipitate obtained is filtered with suction and washed with water until the filtrate is colorless, after which the wet cake is sludged up in 200 parts of water and the suspension uniformly coated onto 500 volumes of the etched quartz, which is agitated and maintained at a sufficiently high temperature so that the water of the suspension is immediately evaporated on striking the fragments.

The contact mass is filled into a converter and calcined with air at 350–400° C., and is then an excellent catalyst for the vapor phase air oxidation of aromatic hydrocarbons, such as the production of naphthalic anhydride from acenaphthene or acenaphthylene, fluorenone from fluorenes or dehydrogenated fluorenes, phthalic anhydride from naphthalene, anthraquinone from anthracene and the like, with or without the addition of steam or indifferent gases to the reaction. Acenaphthene, for example, when uniformly vaporized into an air stream in the ratio of 1:20–30 by weight passed over the mass at 370–400° C. is oxidized to a naphthalic anhydride of excellent purity and a large proportion of the product can be used as a dyestuff intermediate without further purification.

Instead of the iron salt, salts of other metals may be used such as those of copper, nickel, cobalt, silver, aluminum, titanium, zirconium, manganese or cerium, either singly or in admixture. Similarly, other vanadates or complex compounds of vanadic acid may be used, and, if desired, the vanadic acid may be replaced partly or wholly by corresponding acids of other metals of the fifth and sixth groups of the periodic system, such as molybdenum, tungsten, uranium, chromium, tantalum or columbium. Such compounds may be precipitated from solution and applied as a suspension, or they may be coated upon the etched quartz or other etched carrier from the molten state, as in Example 2.

*Example 5*

Fragments of flint, crown glass, quartz or other natural or artificial silicate material are boiled for 1½ to 2 hours with a concentrated NaOH or KOH solution, with or without the addition of aluminum oxide, zinc oxide, or oxides of other amphoteric metal. The etched fragments are drained, given a preliminary rinsing with water, and then washed several times with 5–10% hydrochloric or sulfuric acid to neutralize and remove alkali from the adhering skin of active silica at their surfaces.

The activated carrier is then coated by spraying, dipping or otherwise with oxides or salts of vanadium, molybdenum, chromium or other metals of the fifth and sixth groups of the periodic system, and after calcining at 300–400° C. with air or acid gases or both is an excellent catalyst for the oxidation of mono- and polyvalent alcohols to aldehydes, ketones and acids, such as methyl alcohol and methane to formaldehyde, ethyl alcohol to acetic acid, etc., of phenols such as cresol to salicyl-aldehyde and salicylic acid, and of hydrocarbons such as toluol to benzaldehyde and benzoic acid, naphthalene to phthalic anhydride and acenaphthene to naphthalic anhydride and hemimellitic acid.

The contact mass may be stabilized with acid, neutral or basic salts or hydroxides of alkali or alkaline earth metals such as sodium nitrate, potassium chloride, potassium acid sulfate, sodium or potassium hydroxide or lime, either singly or in admixture, for example as follows:

9.4 parts of $Fe_2(SO_4)_3$ are dissolved in 100 parts water and $Fe_2O_3$ is precipitated by the addition of 14 parts of 10 N. KOH solution. The precipitate is filtered and washed, and suspended in a moderately concentrated solution containing 28 parts $V_2O_5$ and 32 parts of 100% KOH. 140 parts of the etched fragments are coated with this suspension, and after calcination with dilute $SO_2$ gases the catalyst so produced gives excellent yields of phthalic anhydride of high purity when naphthalene vapors admixed with air in the ratio of 1:20–30 by weight is passed over it at temperatures of 380–420° C. In this catalyst the sodium vanadate operates as a stabilized catalyst, while the ferric oxide is a stabilizer promoter which extends the action of the stabilizer.

If the calcination step is omitted, the catalyst can also be used for the catalytic purification of crude aromatic hydrocarbons, such as crude anthracene, crude naphthalene, crude phenanthrene and the like.

A 60–65% anthracene containing only small amounts of carbazole is obtained when vapors of a crude material of 30% anthracene content, admixed with air in the ratio of 1:35–40 are passed over it at 400–420° C.

*Example 6*

Excellent catalysts for reductions, hydrogenations, splitting reactions and the like can also be prepared by the use of etched silicious material. For example, a coated basic copper carbonate catalyst, for use in the production of benzoic acid from phthalic anhydride by the splitting off of $CO_2$ is made as follows:

6.6 parts by weight of copper nitrate containing 3 molecules of water of crystallization are dissolved in 50 parts of water and precipitated by the addition of 2 N. sodium carbonate solution.

The precipitate is filtered, washed, and sludged up in water with 6 parts of Ca(OH)$_2$ and the suspension sprayed onto 200 parts by volume of heated quartz fragments which have been etched by boiling in alkali and washed with 5% HCl.

Instead of copper, zinc may be used in the form of its hydroxide, 18 parts of Zn(NO$_3$)$_2$·6H$_2$O being dissolved and Zn(OH)$_2$ precipitated from solution with ammonia, made into a suspension with lime, and applied by spraying.

*Example 7*

210 cc. quartz fragments of 6-8 mesh are etched by boiling with concentrated KOH solution to which small amounts of freshly precipitated Al(OH)$_3$ have been added. The fragments are then drained, rinsed with distilled water, and washed with 5% HCl or H$_2$SO$_4$ until completely neutral, after which they are again rinsed and heated in a porcelain dish over a sand bath. A solution of 31.8 gr. Ni(NO$_3$)$_2$·6H$_2$O in 120 c. c. water is sprayed on with constant stirring until a uniform coating is produced, after which the mass is filled into a converter and reduced with gases containing hydrogen or carbon monoxide.

Vapors of phthalic anhyride admixed with hydrogen or hydrogen containing gases are passed over the catalyst at temperatures of 200–250° C., producing phthalide and hydroxyphthalimidine. The same catalyst can be used for the hydrogenation of phenol to cyclohexanol, naphthalene to tetraline and decaline, benzaldehyde to benzyl alcohol and other similar reactions.

Instead of nickel, copper nitrate may be applied to the carrier material, in which case the catalyst after reduction is well suited for the reduction of aromatic nitro compounds to amines, such as nitrobenzene to aniline.

In the specification and claims the term "metallate" is used to cover salts, the anions of which contain acid-forming oxides of amphoteric metals, such as those of the 5th, 6th and 7th groups of the periodic system.

This application is in part a continuation of my prior application Serial No. 347,449, filed May 15, 1929, and which has since issued as Patent No. 1,844,393, February 9, 1933.

I claim:

1. A method of preparing catalysts which comprises etching non-porous massive silicious fragments, heating said fragments to a temperature above the boiling point of water and spraying an aqueous dispersion of catalytically-active material thereon, at a rate such that the water of the dispersion is instantly evaporated on contact with the fragments.

2. A method according to claim 1 in which the catalytically active material is ammonium vanadate and the sprayed catalyst is heated to oxidize the ammonium vanadate to vanadic oxide.

3. A method of preparing catalysts which comprises etching massive quartz fragments, heating said fragments to a temperature above the boiling point of water and spraying an aqueous dispersion of catalytically-active material thereon, at a rate such that the water of the dispersion is instantly evaporated on contact with the fragments.

4. A method according to claim 3 in which the catalytically active material is ammonium vanadate and the sprayed catalyst is heated to oxidize the ammonium vanadate to vanadic oxide.

ALPHONS O. JAEGER.